May 20, 1930. S. G. RUSSELL ET AL 1,759,065
FISHING REEL
Filed Sept. 26, 1928
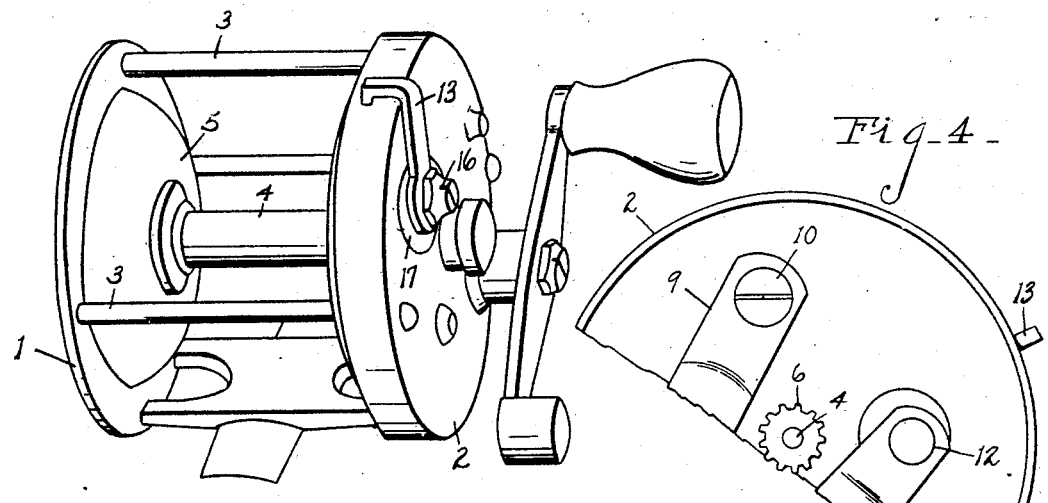
Fig-1.
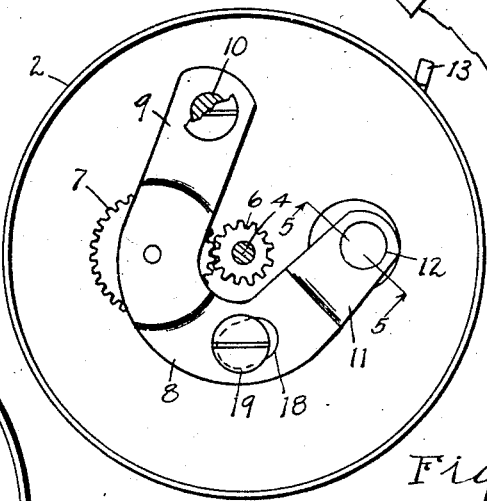
Fig-4.
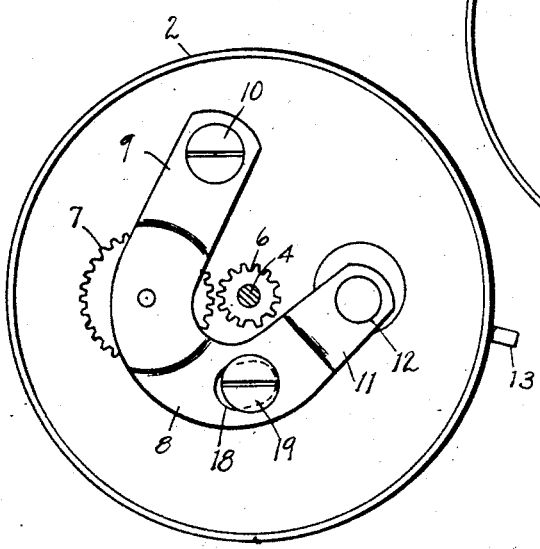
Fig-2.
Fig-3.
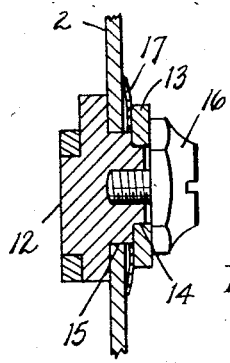
Fig-5.
INVENTOR
Samuel G. Russell
Rossiter R. Potter
BY Chappell Earl
ATTORNEYS Patented May 20, 1930

1,759,065

UNITED STATES PATENT OFFICE

SAMUEL G. RUSSELL AND ROSSITER R. POTTER, OF KALAMAZOO, MICHIGAN, ASSIGNORS TO SHAKESPEARE COMPANY, OF KALAMAZOO, MICHIGAN

FISHING REEL

Application filed September 26, 1928. Serial No. 308,445.

The main object of this invention is to provide in a fishing reel of the free spool type an improved means for supporting and adjusting the movable gear to connect or disconnect the spool with the driving means.

Objects pertaining to details and economies of our invention will appear from the description to follow. The invention is defined in the claims.

A reel which embodies the features of our invention is illustrated in the accompanying drawing, in which:

Fig. 1 is a perspective view of a fishing reel embodying our improvements.

Fig. 2 is a side view of the head member, the spool staff being shown in section and certain parts being sectioned and broken away to show structural details, the gears being shown in mesh.

Fig. 3 is a view similar to that of Fig. 2 with the driving gear disengaged from the spool pinion.

Fig. 4 is a fragmentary view further illustrating the relation of the support, its pivot and the support actuating eccentric.

Fig. 5 is an enlarged detail section on a line corresponding to line 5—5 of Fig. 2.

Referring to the drawing, the reel frame in the embodiment illustrated comprises the tail plate 1, head member 2 and pillars 3. We do not illustrate the structural details of these parts as they form no part of this invention.

The shaft 4 of the spool 5 has a pinion 6 mounted thereon. The driving gear 7 is mounted on the U-shaped support or bridge piece 8 which is arranged to embrace the pinion which is located in the bight of the support. The arm 9 of the support is mounted on the pivot 10 and the gear 7 is mounted on this same arm, but adjacent the bight of the support. The other arm 11 of the support 8 is engaged with the eccentric 12 which is rotatably mounted in the head member. The degree of eccentricity of the eccentric 12 is such that when the eccentric is rotated the support is swung on its pivot 10 sufficiently to bring the driving gear into and out of mesh with the spool pinion and also sufficiently to put a springing stress on the support during the throw of the eccentric so that the support acts as a spring to hold the parts in their adjusted positions.

The eccentric is provided with a lever-like finger-piece 13 which is engaged with the shoulder 14 on the outer end of the pivot portion 15 of the eccentric, the lever being clamped in position by the screw 16. A dished washer 17 is arranged between the lever and the side of the head member. This washer serves as a finishing member and also as a friction member.

To assist in holding the support in position we slot the same at 18 and a headed screw 19 is arranged through this slot with its head overlapping the support. This prevents the bight portion of the support from swinging out of position and insures the proper meshing of the gears when the support is swung to actuated position.

The parts of our invention are very simple and economical and are easily assembled. At the same time the structure is easy to operate and positive in operation.

Having thus described our invention, what we claim as new and desire to secure by Letters Patent, is:

1. In a fishing reel, the combination with a frame provided with a head member, a spool provided with a pinion, a U-shaped support arranged to embrace said pinion and pivoted at the end of one arm to said head member, a driving gear mounted on said support in coacting relation with said pinion, and an eccentric rotatably mounted on said head member and provided with a fingerpiece, said eccentric being engaged in an opening in the other arm of said support whereby when the eccentric is actuated the support is swung on its pivot, the eccentric being positioned relative to the support pivot so that the support is placed under springing stress during the throw of the eccentric.

2. In a fishing reel, the combination with a frame, a spool provided with a pinion, a U-shaped springable support arranged to embrace said pinion, one arm of said support being pivotally mounted on said frame, a driving gear mounted on said support in coacting relation to said pinion, and an actuating eccentric rotatably mounted on said frame in engagement with the other arm of said support, said pivot and eccentric being positioned relative to each other so that the support is placed under stress during the throw of the eccentric.

3. In a fishing reel, the combination with a frame, of a spool provided with a pinion, a U-shaped springable support arranged to embrace said pinion, one arm of said support being pivotally mounted on said frame, a driving gear mounted on said support in coacting relation to said pinion, and an actuating eccentric rotatably mounted on said frame in engagement with the other arm of said support, said pivot and eccentric being positioned so that the support is placed under yielding stress during the throw of the eccentric to engage and disengage the gear.

In witness whereof we have hereunto set our hands.

SAMUEL G. RUSSELL.
ROSSITER R. POTTER.